(12) United States Patent
Inazumi et al.

(10) Patent No.: US 11,080,843 B2
(45) Date of Patent: Aug. 3, 2021

(54) IMAGE INSPECTING APPARATUS, IMAGE INSPECTING METHOD AND IMAGE INSPECTING PROGRAM

(71) Applicant: OMRON Corporation, Kyoto (JP)

(72) Inventors: Shingo Inazumi, Amagasaki (JP); Yutaka Kato, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 161 days.

(21) Appl. No.: 16/219,958

(22) Filed: Dec. 14, 2018

(65) Prior Publication Data

US 2019/0272630 A1    Sep. 5, 2019

(30) Foreign Application Priority Data

Mar. 5, 2018   (JP) .............................. JP2018-038540

(51) Int. Cl.
*G06T 7/00* (2017.01)
*H04N 5/232* (2006.01)
(Continued)

(52) U.S. Cl.
CPC .......... *G06T 7/0008* (2013.01); *B25J 9/1671* (2013.01); *B25J 9/1697* (2013.01);
(Continued)

(58) Field of Classification Search
CPC ... G06T 7/0002; G06T 7/0008; G06T 7/0004; G01N 21/95; G03F 1/84; G21C 17/01
See application file for complete search history.

(56) References Cited

U.S. PATENT DOCUMENTS 6,166,811 A * 12/2000 Long ...................... G01S 17/42
356/602
7,916,971 B2 * 3/2011 Bigioi ................ G06K 9/00288
382/275
(Continued)

FOREIGN PATENT DOCUMENTS

CN    1922473    2/2007
CN    104903712    9/2015
(Continued)

OTHER PUBLICATIONS

NPL Google Search; 2020; (Year: 2020).*
(Continued)

*Primary Examiner* — Luis Perez-Fuentes
(74) *Attorney, Agent, or Firm* — JCIPRNET (57) ABSTRACT

An image inspecting apparatus includes at least one image capturing part, a lighting part, a control part including a moving part, a searching part analyzing an image captured by the image capturing part under a first image capturing condition and searching for a defect candidate from an object under inspection, and a determining part. When the searching part finds the defect candidate from the object under inspection, the control part controls an image capturing condition such that a part where the defect candidate is found by the searching part is photographed under a second image capturing condition that is clearer than the first image capturing condition. The determining part analyzes an image captured by the image capturing part under the second image capturing condition and determines whether the defect of the object under inspection is present or absent.

20 Claims, 4 Drawing Sheets

(51) Int. Cl.
  *H04N 5/247* (2006.01)
  *G01N 21/95* (2006.01)
  *B25J 9/16* (2006.01)
  *G01N 21/88* (2006.01)
  *G01N 21/956* (2006.01)

(52) U.S. Cl.
  CPC ..... *G01N 21/8851* (2013.01); *G01N 21/9515* (2013.01); *H04N 5/23218* (2018.08); *H04N 5/23299* (2018.08); *H04N 5/247* (2013.01); *G01N 2021/8867* (2013.01); *G01N 2021/8887* (2013.01); *G01N 2021/9518* (2013.01); *G01N 2021/95638* (2013.01); *G06T 2207/20016* (2013.01); *G06T 2207/30108* (2013.01)

(56) References Cited

U.S. PATENT DOCUMENTS

| | | | | |
|---|---|---|---|---|
| 8,903,158 | B2* | 12/2014 | Tsuchiya | G03F 1/84 382/149 |
| 8,976,242 | B2* | 3/2015 | Aikawa | G21C 17/08 348/142 |
| 9,865,046 | B2* | 1/2018 | Urano | G06T 7/33 |
| 10,748,020 | B2* | 8/2020 | Inazumi | G03F 7/20 |
| 10,859,506 | B2* | 12/2020 | Kato | G01B 11/245 |
| 2015/0285744 | A1* | 10/2015 | Ogawa | G02B 27/286 348/126 |
| 2016/0103079 | A1* | 4/2016 | Moroli | G01N 21/8806 356/237.2 |
| 2018/0204090 | A1* | 7/2018 | Konishi | G06T 7/74 |
| 2019/0073760 | A1 | 3/2019 | Wang et al. | |
| 2019/0272630 | A1* | 9/2019 | Inazumi | G01N 21/9515 |

FOREIGN PATENT DOCUMENTS

| | | |
|---|---|---|
| CN | 106796179 | 5/2017 |
| EP | 1582863 | 10/2005 |
| JP | 2005292136 | 10/2005 |
| JP | 2007155412 | 6/2007 |
| JP | 2008055569 | 3/2008 |
| JP | 2009014357 | 1/2009 |
| JP | 2013191064 | 9/2013 |
| WO | 2017171651 | 10/2017 |

OTHER PUBLICATIONS

Super-Resolution with Significant Illumination; Zha—2004 (Year: 2004).*
Inspection methods—Overview and comparison; 2013; (Year: 2013).*
Lightning in Inspection; Witkowski; 2017; (Year: 2017).*
"Search Report of Europe Counterpart Application", dated Jun. 28, 2019, pp. 1-7.
"Office Action of Japan Counterpart Application" with English translation thereof, dated Feb. 9, 2021, p. 1-p. 10.
Office Action of China Counterpart Application, with English translation thereof, dated May 7, 2021, pp. 1-24.

* cited by examiner

IMAGE INSPECTING APPARATUS, IMAGE INSPECTING METHOD AND IMAGE INSPECTING PROGRAM

CROSS-REFERENCE TO RELATED APPLICATION

This application claims the priority benefit of Japanese Patent Application serial no. 2018-038540, filed on Mar. 5, 2018. The entirety of the above-mentioned patent application is hereby incorporated by reference herein and made a part of this specification.

BACKGROUND

Technical Field

The disclosure relates to an image inspecting apparatus, an image inspecting method, and an image inspecting program.

Description of Related Art

In recent years, an image inspecting apparatus which inspects the appearance of a product by using an image has been widely used in order to automatize the inspection and save the labor in the production line (see, for example, Patent Document 1: Japanese Laid-Open No. 2013-191064). While there are various types and methods of appearance inspection, the basic configuration is as follow. The image of an object under inspection is captured by an image capturing apparatus with a built-in image sensor, a portion serving as the inspection region is extracted from the obtained image, and the targeted inspection is performed by analyzing and evaluating the features of the image of the portion as the inspection region (e.g., judging on good/defective, sorting, obtaining information, etc.).

In this type of image inspecting apparatus, to inspect the appearance of the object under inspection, it is necessary to capture images of the object under inspection from various directions. Also, in recent years, due to the strong need for facilitating the production efficiency in multi-type, small-scale production, it is required to appropriately change the parts of the object under inspection flowing in the production line at which images are captured according to the shape of the object under inspection, etc. Therefore, recently, in order to enable such appearance inspection, an attempt has been made to adjust the position and the orientation of the image capturing apparatus by using a robot arm according to the shape of the object under inspection, etc., in the image capturing of the object under inspection.

In the case in which an image capturing apparatus used for image inspection is fixed, the part where an image can be captured at the object under inspection flowing in the production line is determined naturally. Therefore, the time required for capturing an image of the object under inspection in the image inspection is basically unchanged. On the other hand, in the case in which the image of the object under inspection flowing in the production line is captured by using an image capturing apparatus attached to a robot arm, the time required for capturing an image changes according to the operation speed of the robot arm and the number of times of movement of the image capturing apparatus. Therefore, if image capturing is performed by efficiently moving the image capturing apparatus attached to the robot arm, there is a possibility that such image capturing can cope with multi-type, small-scale production and shorten the time required for capturing the image of the object under inspection as compared with the case in which the image of the object under inspection is captured by using the fixed image capturing apparatus. However, since objects that can be easily removed, such as a simply attached foreign matter, may be present on the object under inspection in addition to defects such as irreparable scratches, in the image inspection in the production line, the type of defect appearing in the image needs to be determined by performing an image analysis. In order to perform such an image analysis, it is necessary to use a high-resolution image. Therefore, if it is attempted to carry out the image analysis on the appearance of the object under inspection to the extent of every corner by using the image capturing apparatus attached to the robot arm, the number of times of movement of the image capturing apparatus and the calculation processing required for the image analysis are expected to increase.

SUMMARY

The disclosure provides an image inspecting apparatus for inspecting an object under inspection by using an image. The image inspecting apparatus comprises: at least one image capturing part which captures an image of the object under inspection; a lighting part which irradiates the object under inspection with light; a control part of image capturing condition which comprises a moving part for changing a mutual relative positional relationship of at least two of the image capturing part, the object under inspection, and the lighting part; a searching part which analyzes an image captured by the image capturing part under a first image capturing condition and searches for a defect candidate from the object under inspection; and a determining part which analyzes the image captured by the image capturing part and determines whether a defect of the object under inspection is present or absent, wherein when the searching part finds the defect candidate from the object under inspection, the control part controls an image capturing condition such that a part where the defect candidate is found by the searching part is photographed under a second image capturing condition that is clearer than the first image capturing condition, and wherein the determining part analyzes an image captured by the image capturing part under the second image capturing condition and determines whether the defect of the object under inspection is present or absent.

The disclosure provides an image inspecting method for inspecting an object under inspection by using an image. The image inspecting method comprises: a searching process for analyzing an image captured under a first image capturing condition by an image capturing part that captures an image of the object under inspection and searching for a defect candidate from the object under inspection; a control process for controlling an image capturing condition by a control part of image capturing condition comprising a moving part for changing a mutual relative positional relationship of at least two of the image capturing part, the object under inspection, and a lighting part which irradiates the object under inspection with light, such that when the defect candidate is found from the object under inspection in the searching process, a part where the defect candidate is found in the searching process is photographed under a second image capturing condition clearer than the first image capturing condition; and a determining process for analyzing an image captured by the image capturing part under the second image capturing condition and determining whether a defect of the object under inspection is present or absent.

The disclosure provides an image inspecting program for inspecting an object under inspection by using an image. The image inspecting program causes a computer to execute: a searching process for analyzing an image captured under a first image capturing condition by an image capturing part that captures an image of the object under inspection and searching for a defect candidate from the object under inspection; a control process for controlling an image capturing condition by a control part of image capturing condition comprising a moving part for changing a mutual relative positional relationship of at least two of the image capturing part, the object under inspection, and a lighting part which irradiates the object under inspection with light, such that when the defect candidate is found from the object under inspection in the searching process, a part where the defect candidate is found in the searching process is photographed under a second image capturing condition clearer than the first image capturing condition; and a determining process for analyzing an image captured by the image capturing part under the second image capturing condition and determining whether a defect of the object under inspection is present or absent.

DESCRIPTION OF THE EMBODIMENTS

Therefore, the disclosure discloses a technology that makes it possible to shorten the time required for image inspection while making it possible to cope with multi-type, small-scale production.

According to the disclosure, when an image captured under a first image capturing condition is analyzed and a defect candidate is found, an image in which a part where the defect candidate is found is photographed under a second image capturing condition clearer than the first image capturing condition is analyzed and whether a defect is present or absent is determined.

In detail, the disclosure provides an image inspecting apparatus for inspecting an object under inspection by using an image. The image inspecting apparatus includes: at least one image capturing part which captures an image of the object under inspection; a lighting part which irradiates the object under inspection with light; a control part of image capturing condition which includes a moving part for changing a mutual relative positional relationship of at least two of the image capturing part, the object under inspection, and the lighting part; a searching part which analyzes an image captured by the image capturing part under a first image capturing condition and searches for a defect candidate from the object under inspection; and a determining part which analyzes the image captured by the image capturing part and determines whether a defect of the object under inspection is present or absent. When the searching part finds the defect candidate from the object under inspection, the control part controls an image capturing condition so that a part where the defect candidate is found by the searching part is photographed under a second image capturing condition that is clearer than the first image capturing condition. The determining part analyzes an image captured by the image capturing part under the second image capturing condition and determines whether the defect of the object under inspection is present or absent.

Here, the object under inspection is an object to undergo image inspection performed by the image inspecting apparatus, and examples of the object under inspection include industrial products manufactured in a production line, industrial products recycled from the market, components of industrial products, agricultural products that are harvested or fishery products that are caught, and various other objects.

Further, the image capturing condition is the condition that can affect the determination on whether the defect of the object under inspection is present or absent in the analysis of the image of the object under inspection captured by the image capturing part. Examples of those that may influence the photographing condition of the object under inspection include the relative distance and orientation between the object under inspection and the image capturing part, the setting state of an image capturing element included in the image capturing part, the state of a lens provided in the image capturing part, and various others. For example, in the case in which the object under inspection has a defect, since the relative distance between the part where the defect is present and the image capturing part becomes shorter, and the defect is photographed larger in the image, the defect is photographed clearly in the image, and the possibility that whether the defect is present or absent is erroneously determined in the image inspection decreases.

In addition, the defect candidate refers to one that is possibly a defect in the image of the object under inspection captured under the first image capturing condition, and is not a concept intended for one that may become a defect in the future through a temporal change after the image inspection, for example.

In the image inspecting apparatus, the search for the defect candidate suspected to have the defect is firstly performed. In the case in which the defect candidate is found, whether the defect is present or absent at the part where the defect candidate is found is determined. Since the search for the defect candidate is a process simpler than the determination on whether the defect is present or absent, the high computing capacity for analyzing the image is not required. Then, in the image inspecting apparatus, the determination on whether the defect is present or absent, which requires a higher computing capacity than that of the search for the defect candidate, is omitted for the part where the defect candidate is not found. Therefore, compared with the case in which the determination on whether the defect is present or absent is performed over the entire object under inspection, the time required for image inspection of the object under inspection can be shortened.

According to an embodiment of the disclosure, the searching part analyzes an image captured by the image capturing part at a first resolution and searches for the defect candidate from the object under inspection, and when the searching part finds the defect candidate from the object under inspection, the control part changes a relative position of the image capturing part with respect to the object under inspection or a field of view of the image capturing part, so that the part where the defect candidate is found by the searching part is photographed at a second resolution that is a resolution higher than the first resolution.

Here, the resolution is a quantitative representation of the fineness of the image of the object under inspection in the image captured by the image capturing part. For example, the resolution varies with the number of pixels of the image capturing element possessed by the image capturing part, the relative distance and orientation between the object under inspection and the image capturing part, the state of the lens included in the image capturing part, and various other conditions.

If the part where the defect candidate is found is photographed at the second resolution that is a solution higher than the first resolution, since the shape of the defect, etc., can be specified from the image at the second resolution, the defect can be determined correctly.

In addition, according to an embodiment of the disclosure, the searching part analyzes the image of the object under inspection photographed at the first resolution by moving the image capturing part to a first position by the control part and searches for the defect candidate from the object under inspection, and when the searching part finds the defect candidate from the object under inspection, the control part moves a position of the image capturing part to a second position closer to the object under inspection than the first position, so that the part where the defect candidate is found by the searching part is photographed at the second resolution.

Here, the first position refers to a relative positional relationship of the image capturing part with respect to the object under inspection, and is an example of the first image capturing condition. Also, the second position is a relative positional relationship of the image capturing part with respect to the object under inspection, refers to a positional relationship with which the part of the defect candidate is more clearly photographed than the case in which the image capturing part captures the image of the object under inspection at the first position, and is an example of the second image capturing condition.

If the position of the image capturing part with respect to the object under inspection is closer at the second position which is the positional relationship at the time when the image used for the determining part to determine whether the defect is present or absent is obtained than at the first position which is the positional relationship at the time when the image used for the searching part to search for the defect candidate is obtained, since the part of the defect candidate is photographed more clearly in the image captured at the second position than the image captured at the first position, the defect can be determined more correctly.

In addition, according to an embodiment of the disclosure, the searching part calculates a feature value of the defect candidate including a position of the defect candidate when finding the defect candidate from the object under inspection, and when the searching part finds the defect candidate from the object under inspection, the control part changes at least one of a relative angle between an optical axis of the image capturing part and the object under inspection, relative positions between the lighting part and the object under inspection, and a relative angle between the optical axis of the lighting part and the object under inspection based on the feature value calculated by the searching part, so that the part where the defect candidate is found by the searching part is photographed under the second image capturing condition.

Here, the feature value of the defect candidate is a value quantitatively indicating a feature related to the defect candidate in the image captured under the first image capturing condition, and includes the position of the defect candidate, for example. Such a feature value can be obtained from a difference with respect to a reference image in which a good object under inspection without a defect is photographed, for example. If such a feature value is obtained from the image captured under the first image capturing condition, the relative positional relationship between the image capturing part, the lighting part and the object under inspection under the second image capturing condition can be appropriately determined.

Further, according to an embodiment of the disclosure, the searching part analyzes an image captured by a first image capturing part under the first image capturing condition and searches for the defect candidate from the object under inspection, and when the searching part finds the defect candidate from the object under inspection, the control part controls the image capturing condition so that the part where the defect candidate is found by the searching part is photographed under the second image capturing condition in an image captured by a second image capturing part different from the first image capturing part. If the image capturing part that captures the image of the object under inspection under the second image capturing condition is prepared separately from the image capturing part that captures the image of the object under inspection under the first image capturing condition, the inspection can be further sped up.

In addition, according to an embodiment of the disclosure, when the searching part finds a plurality of defect candidates from the object under inspection, the control part controls the image capturing condition, so that a part of a candidate whose value indicating a grade of a defect is great, among the defect candidates found by the searching part, is preferentially photographed under the second image capturing condition.

Here, the value indicating the grade of the defect is a value quantitatively indicating how high the probability is that the defect candidate is a defect in the image captured under the first image capturing condition, and can be obtained from the difference with respect to a reference image in which a good object under inspection without a defect is photographed. If the image of the part of the defect whose value indicating the grade of the defect is great is preferentially captured under the second image capturing condition and the image is used to determine the defect, since the determination on whether the defect is present or absent is made preferentially from the part having a high possibility to be a defect, the determination on whether the defect is present or absent is performed more efficiently.

In addition, according to an embodiment of the disclosure, in a case in which a defect is present in an image in which at least one of the defect candidates found by the searching part is photographed, the determining part omits analyses of images in which other defect candidates are photographed. In the case in which the presence of at least one defect is recognized in the object under inspection, the analyses on the parts of other defect candidates can be omitted, and the inspection of the object under inspection can be finished promptly.

In addition, the disclosure can also be understood from the aspects of a method and a program. For example, the disclosure discloses an image inspecting method for inspecting an object under inspection by using an image. It may also be that the image inspecting method includes: a searching process for analyzing an image captured under a first image capturing condition by an image capturing part that captures an image of the object under inspection and searching for a defect candidate from the object under inspection; a controlling process for controlling an image capturing condition by a control part of image capturing condition including a moving part for changing a mutual relative positional relationship of at least two of the image capturing part, the object under inspection, and a lighting part which irradiates the object under inspection with light, so that when the defect candidate is found from the object under inspection in the searching process, a part where the defect candidate is found in the searching process is photographed under a second image capturing condition clearer than the first image capturing condition; and a determining process for analyzing an image captured by the image capturing part under the second image capturing condition and determining whether a defect of the object under inspection is present or absent.

With the image inspecting apparatus, the image inspecting method and the image inspecting program, it is possible to cope with multi-type, small-scale production while shortening the time required for image inspection.

Figure 1:
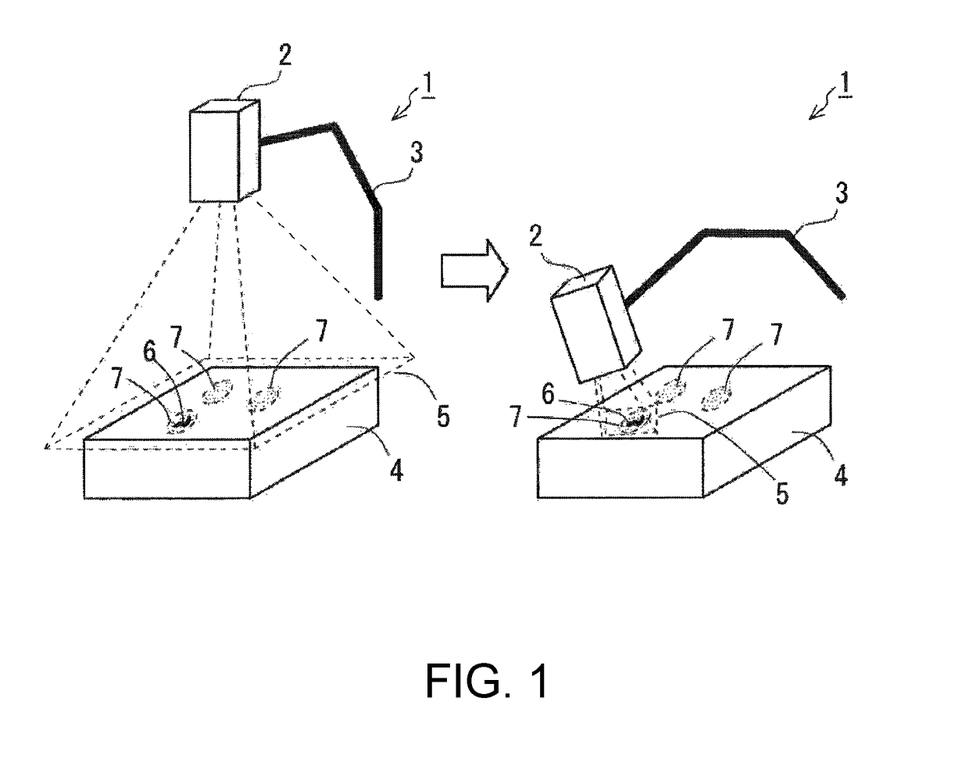
FIG. 1 is a schematic view showing an example of an operation realized by an image inspecting apparatus according to an embodiment.

<Application example> FIG. 1 is a schematic diagram showing an example of the operation realized by an image inspecting apparatus 1 according to the embodiment. As shown in FIG. 1, the image inspecting apparatus 1 includes a camera 2 (an example of the "image capturing part" in the disclosure) and a robot arm 3 (an example of the "moving part" in the disclosure), for example, as the main configuration. The camera 2 obtains an image used for inspecting an object 4 under inspection. The robot arm 3 is an industrial robot arm in which the camera 2 is installed to the tip of the arm, and the robot arm 3 operates according to a control signal sent from a control apparatus (not shown). Therefore, by operating the robot arm 3, the camera 2 can move relatively to an appropriate position with respect to the object 4 under inspection. In addition, a lighting for illuminating the object 4 under inspection may be integrated with the camera 2, or the lighting may be attached to the tip of the robot arm 3 separately from the camera 2.

The image data obtained by capturing the image of the object 4 under inspection by the camera 2 is sent to an image processing unit (not shown) provided in the image inspecting apparatus 1. In the image processing unit, an image analysis of the object 4 under inspection using the image data sent from the camera 2 is carried out. The object 4 under inspection for which whether a defect 6 is present or absent is verified by the image processing unit is sent to the next process. Examples of the defect 6 whose presence or absence is verified by the image processing unit include uneven defects such as dent marks caused by collision of articles with the object 4 under inspection, color defects caused by defects in the surface treatment such as painting, attached foreign matters, and various other defects. Some of these examples of the defect 6 are easy to treat while others are irreparable. For example, if the defect 6 detected in the inspection on the appearance of the object 4 under inspection by using the image is simply an attached foreign matter, the defect 6 can be eliminated by removing the foreign matter. Therefore, the destination of the object 4 under inspection which has been inspected by the image inspecting apparatus 1 may be switched according to the presence or absence of the defect 6 and the type of the defect 6.

In the image inspecting apparatus 1 so configured, for example, the image of the object 4 under inspection is captured in a state in which the camera 2 is disposed at a position where the entire object 4 under inspection enters the field of view 5 of the camera 2 by using the robot arm 3. Then, when a defect candidate 7 suspected to have the defect 6 is found in the image captured at the position where the entire object 4 under inspection enters the field of view 5 of the camera 2, the camera 2 is moved by the robot arm 3 and captures the image of the part of the defect candidate 7 again, so as to more clearly photograph the part of the defect candidate 7. Then, the image inspecting apparatus 1 performs inspection by using the image in which the part of the defect candidate 7 is photographed and determines whether the defect 6 is present or absent.

The defect 6 includes various forms as described above. Therefore, in the process of determining whether the defect 6 is present or absent, it is necessary to perform an image analysis using various features, such as shape or color, texture, three-dimensional shape such as unevenness, etc., of the defect 6 photographed in the image. Therefore, in the process of determining whether the defect 6 is present or absent, the image in which the defect 6 is photographed is required to have a sufficient resolution so as to extract the feature such as the shape of the defect 6. Also, in order to analyze the image at such a resolution, a high computing capacity is required. Therefore, in the case in which the determination on whether the defect 6 is present or absent is performed over the entire object 4 under inspection, in order to obtain an image at the sufficient resolution so as to extract the feature such as the shape of the defect 6, a plurality of images of the object 4 under inspection captured from various viewpoints are required. Also, to analyze all these images, a tremendous amount of computing capacity is required.

In this regard, in the image inspecting apparatus 1 of this embodiment, a search for the defect candidate 7 suspected to have the defect 6 is firstly performed, as described above. In the case in which the defect candidate 7 is found, whether the defect 6 is present or absent at the part where the defect candidate 7 is found is determined. Since the search for the defect candidate 7 does not require extraction of the feature such as the shape of the defect 6, the resolution is lower than the resolution of the image used for determining whether the defect 6 is present or absent, and the high computing capacity for analyzing the image is not required. Then, in the image inspecting apparatus 1, the determination on whether the defect 6 is present or absent, which requires a higher computing capacity for a higher resolution than that of the search for the defect candidate 7, is omitted for the part where the defect candidate 7 is not found. Therefore, compared with the case in which the determination on whether the defect 6 is present or absent is performed over the entire object 4 under inspection, the time required for image inspection of the object 4 under inspection can be shortened.

Incidentally, the image inspecting apparatus 1 may also perform the search for the defect candidate 7 by using an image in which a portion of the object 4 under inspection is photographed, for example, instead of using the image captured when the camera 2 is positioned at the position where the entire object 4 under inspection enters the field of view. In addition, the determination by the image inspecting apparatus 1 on whether the defect 6 is present or absent by using the image in which the part of the defect candidate 7 is photographed may be performed by using an image that is photographed more clearly by changing the field of view of the camera 2, for example, instead of using an image that is photographed more clearly through moving the camera 2 by the robot arm 3.

In the image inspecting apparatus 1, for example, the phase shift method or various other three-dimensional measurement methods can be applied. The image inspecting apparatus 1 can be used, for example, as one of the FA apparatuses used in the production line for manufacturing automobiles or various other industrial products.

Figure 2:
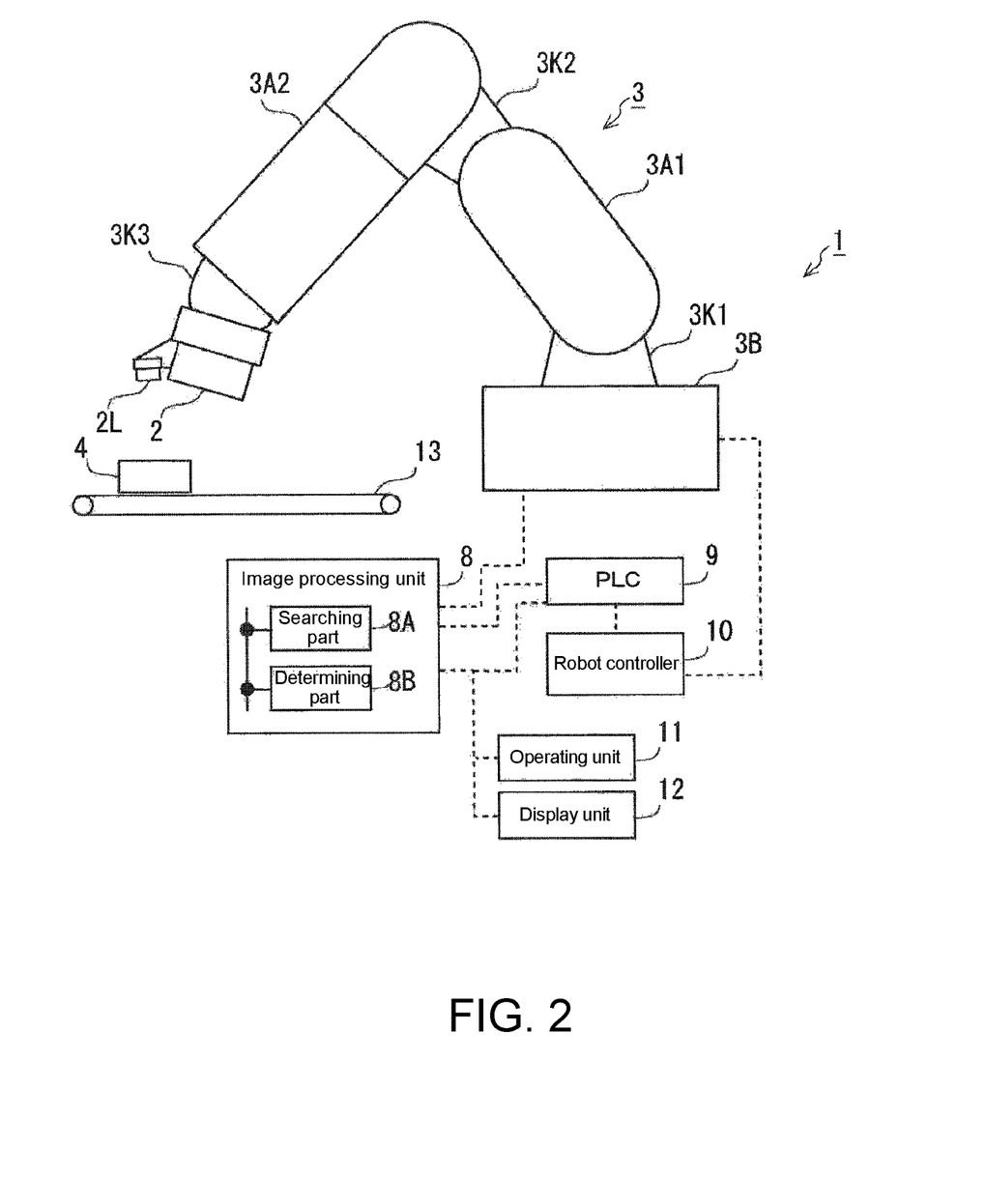
FIG. 2 is a view showing an example of an overall configuration of an image inspecting apparatus.

<Embodiment> The image inspecting apparatus 1 will be described in detail below. FIG. 2 is a view showing an example of the overall configuration of the image inspecting apparatus 1. The image inspecting apparatus 1 includes, in addition to the camera 2 and the robot arm 3 described above, an image processing unit 8 in charge of processing of the image data sent from the camera 2, a programmable logic controller (PLC) 9 (an example of the "control part" in the disclosure) in charge of control of the camera 2 and the robot arm 3, and a robot controller 10 operating the robot arm 3 according to the instruction of the PLC 9. The image processing unit 8 may be, for example, a general-purpose computer having a central processing unit (CPU), a memory, an auxiliary storage apparatus (e.g., a hard disk drive, a solid state drive, etc.), and an input apparatus (a keyboard, a mouse, a touch panel, etc.), or an apparatus dedicated to image processing. The same applies for the PLC 9 and the robot controller 10.

The camera 2 has an image capturing element in which m×n light receiving elements are arrayed in a matrix, and is a device that captures a colored or monochrome, still or moving image to the image processing unit 8. However, in the case in which a special image (X-ray image, thermo image, etc.) other than a visible light image is used for inspection, a sensor adapted to this image may be used.

A lighting 2L is provided along with the camera 2. The lighting 2L is an illumination component that illuminates the object 4 under inspection. The lighting 2L may be, for example, an illumination component having a single light source or may also be an illumination component having a plurality of light sources capable of respectively emitting illuminating light in different wavelengths (red light, green light, blue light) at arbitrary intensities. The respective single or plurality of light sources may emit light in various wavelengths, such as visible light, ultraviolet light, infrared light, etc., or may emit light in a specific wavelength. Moreover, the lighting 2L may be an illumination component for emitting light without a shape pattern, or may be an illumination component for emitting light having a pattern of a predetermined shape.

The robot arm 3 is a so-called multiple joint robot, and includes a first arm 3A1 connected to a base 3B via a first joint 3K1, and a second arm 3A2 connected to the tip part of the first arm 3A1 via a second joint 3K2. The camera 2 and the lighting 2L are provided at the tip of the second arm 3A2 via a third joint 3K3. A drive mechanism, such as a motor, for rotating each arm around the axis of each joint is built in the robot arm 3 and operates according to the instruction sent from the robot controller 10.

In the image processing unit 8, with the CPU executing a computer program (an example of the "image inspecting program" in the disclosure) developed in the memory, a searching part 8A (an example of the "searching part" in the disclosure) and a determining part 8B (an example of the "determining part" in the disclosure) are realized. The searching part 8A is mainly in charge of the image analysis for analyzing the image of the object 4 under inspection captured by the camera 2 and searching for the defect candidate 7 from the object 4 under inspection. The determining part 8B is mainly in charge of the process for analyzing the image of the object 4 under inspection captured by the camera 2 and determining whether the defect 6 of the object 4 under inspection is present or absent.

An operating unit 11, a display unit 12, and a transport unit 13 are provided in the image inspecting apparatus 1. The operating unit 11 is an input apparatus disposed to an appropriate place easy for the operator handling the image inspecting apparatus 1 to operate, and receives various operations performed by the operator on the image inspecting apparatus 1. The operating unit 11 may be a touch panel integrating the display unit 12, a keyboard commonly used for a general purpose computer, or a specifically designed input apparatus. The display unit 12 is a display apparatus disposed to an appropriate place easily visible for the operator handling the image inspecting apparatus 1, and displays the status of each component of the image inspecting apparatus 1, the image obtained by the camera 2, the defect candidate 7 found by the image processing unit 8, and the result of determination on whether the defect 6 is present or absent. The transport unit 13 includes a table or a transport mechanism for setting the object 4 under inspection and transports the object 4 under inspection according to the instruction sent from the PLC 9.

The processing flow realized in the image inspecting apparatus 1 will be described below.

Figure 3:
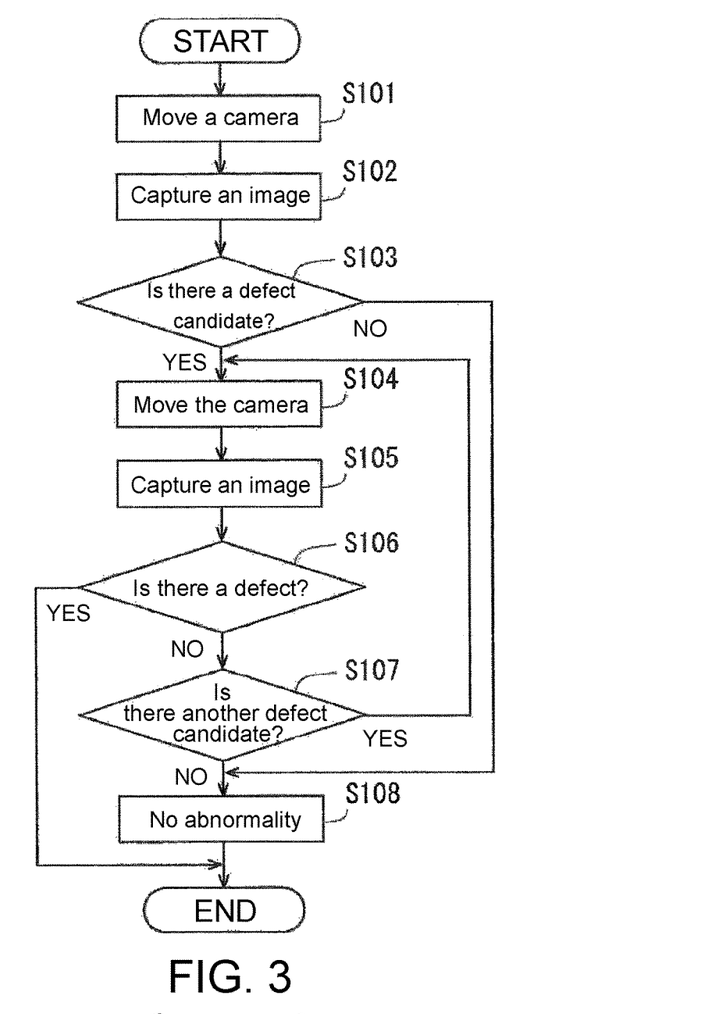
FIG. 3 is a flowchart showing an example of a processing flow realized in an image inspecting apparatus.

FIG. 3 is a flowchart showing an example of a processing flow realized in the image inspecting apparatus 1. When the image inspection is started at the image inspecting apparatus 1, the PLC 9 operates the robot arm 3 so as to set the camera 2 to the position where the entire object 4 under inspection enters the field of view (S101). In Step S101, the position of the camera 2 that the PLC 9 moves by using the robot arm 3 may be a position defined in advance for each type of the object 4 under inspection, or may also be a position that is specified while analyzing the photographing condition of the object 4 under inspection in the image of the camera 2. Also, the PLC 9 may also move the camera 2 to several positions where the entire object 4 under inspection can be verified by combining a plurality of images, instead of moving the camera 2 to a position where the entire object 4 under inspection is contained in one image.

When the camera 2 is moved to the position where the entire object 4 under inspection enters the field of view under the control of the PLC 9, the PLC 9 causes the camera 2 to capture the image of the object 4 under inspection (S102). When the camera 2 captures the image of the object 4 under inspection, the lighting 2L illuminates the object 4 under inspection. The timing and the illuminance at which the lighting 2L is lit is in accordance with the instruction of the PLC 9. The relative positional relationship between the camera 2 and the object 4 under inspection at the time when the image is captured in Step S102 is an example of the "first image capturing condition" in the disclosure.

When the camera 2 captures the image of the entire object 4 under inspection under the control of the PLC 9, the searching part 8A analyzes the image data obtained by the camera 2 in Step S102 (S103). Then, the searching part 8A searches for the defect candidate 7 from the image in which the object 4 under inspection is photographed. The searching part 8A performs the search for the defect candidate 7 according to the following method, for example.

For example, in the case in which the object 4 under inspection photographed in the image obtained by the camera 2 has no defect, there is no difference generated even if the image of the camera 2 is compared with the reference image in which a good object 4 under inspection without the defect 6 is photographed. On the other hand, in the case in which the object 4 under inspection photographed the image obtained by the camera 2 has the defect 6, a difference is generated by comparing the image of the camera 2 with the reference image in which a good object 4 under inspection without the defect 6 is photographed. Therefore, in the analysis of Step S103, for example, a spatial filter is applied to the image of the objects 4 under inspection to extract the portion with a change in the image. For example, Laplacian of Gaussian (LOG) can be used as the spatial filter at the time of extracting the portion with a change in the image. Then, for example, the difference between the model image stored in advance in a storage apparatus, etc., of the searching part 8A and the image of the object 4 under inspection obtained in Step S102 is derived. Then, the place where the difference is greater than a predetermined value is defined as the defect candidate 7.

When the defect candidate 7 is found from the image of the object 4 under inspection by such a process, the PLC 9 moves the camera 2 to approach the defect candidate 7 by using the robot arm 3 (S104), so as to more clearly photograph the defect candidate 7 found in Step S103. The position of the camera 2 that the PLC 9 moves by using the robot arm 3 in Step S104 may be a position defined in advance for each position of the defect candidate 7 in the object 4 under inspection, or may also be a position specifying the position where the defect candidate 7 enters the field of view of the camera 2 in an appropriate size from the analysis result of the image of the camera 2. The motion of the robot arm 3 when moving the camera 2 is realized by determining the most appropriate motion of each joint after moving the camera 2 from the origin of movement to the destination of movement, and sending the signal with an amount of control according to the determined motion to each motor of the robot arm 3 by the robot controller 10 that receives the instruction from the PLC9.

When the camera 2 moves to a position close to the defect candidate 7 under the control of the PLC 9, the PLC 9 causes the camera 2 to capture an image of the object 4 under inspection (S105). When the camera 2 captures the image of the object 4 under inspection, the lighting 2L illuminates the object 4 under inspection like in Step S102. In Step S105, since the camera 2 has moved to a position closer to the defect candidate 7, in the image of the object 4 under inspection captured by the camera 2, the defect candidate 7 is photographed more clearly than in the image of the object 4 under inspection obtained by the camera 2 in Step S102. The relative positional relationship between the camera 2 and the object 4 under inspection at the time when the image is captured in Step S105 is an example of the "second image capturing condition" in the disclosure.

When the image of the part of the defect candidate 7 is captured by the camera 2 under the control of the PLC 9, the determining part 8B analyzes the image data obtained by the camera 2 in Step S105 (S106). Then, the determining part 8B analyzes the image of the object 4 under inspection captured by the camera 2 and determines whether the defect 6 is present or absent in the part of the defect candidate 7 photographed in the image of the object 4 under inspection. The determining part 8B determines whether the defect 6 is present or absent by using the following method.

That is, the determining part 8B calculates the feature value of the image at the part of the defect candidate 7 and determines whether defect candidate 7 is the defect 6. Examples of the feature value include, for example, a feature value enabling a binary blob analysis of circularity, perimeter, or a Feret's diameter (projection width), etc. Based on such a feature value, the determining part 8B determines whether the defect candidate 7 is the defect 6.

Regarding the light amount of the reflected light from the object 4 under inspection received by each pixel of the image capturing element of the camera 2, for pixels corresponding to a color defect, an uneven defect, the place where a foreign matter is attached, etc., a difference is generated by comparing with the surrounding pixels. Therefore, in the analysis of Step S106, for example, whether the defect 6 is generated in the object 4 under inspection may also be detected by illuminating the object 4 under inspection with the lighting 2L and comparing the light amounts of the reflected light from the object 4 under inspection received by the respective pixels of the image capturing element of the camera 2 for the each of the pixels. Further, in determining the type of the defect 6, for example, based on a plurality of images captured while switching the color of the illumination light of the lighting 2L, whether the defect 6 is a color defect, whether defect 6 is an uneven defect, etc., may also be determined. Examples of the index used for determining the defect 6 also include, for example, the position and the size of a specific color in the image of the object 4 under inspection, in addition to comparing the light amount in each pixel and switching the color of the illuminating light.

When the defect 6 is photographed in the image captured in Step S105, the determining part 8B makes an affirmative determination in Step S106. When the determining part 8B makes the affirmative determination in Step S106, the PLC 9 ends the inspection of the object 4 under inspection. When the PLC 9 ends the inspection of the object 4 under inspection, the object 4 under inspection is transferred to a predetermined place according to the inspection result. In addition, if the defect 6 is not photographed in the image captured in Step S105, the determining part 8B makes a negative determination in Step S106.

Also, when the determining part 8B makes a negative determination in Step S106, the PLC 9 determines whether another defect candidate 7 is present or absent (S107). In the case in which there is no other defect candidate 7, the PLC 9 gives a determination result that the object 4 under inspection has no abnormality in the inspection of the object 4 under inspection in the image inspecting apparatus 1 (S108). Further, in the case in which there is another defect candidate 7, the PLC 9 execute the process of Step S104 so as to clearly photograph the another defect candidate 7. As a result, whether the defect 6 is present or absent is determined for all the parts of the defect candidates 7 found in Step S103.

In the image inspecting apparatus 1 of the above embodiment, the search for the defect candidate 7 suspected to have the defect 6 is firstly performed by using the image of Step S102, and in the case in which the defect candidate 7 is found, whether the defect 6 is present or absent in the part where the defect candidate 7 is found is determined by using the image of Step S105. Then, in Step S105, since the camera 2 has moved to a position closer to the defect candidate 7 than the position in Step S102, the resolution (an example of the "second resolution" in the disclosure) of the object 4 under inspection photographed in the image captured by the camera 2 in Step S105 is a resolution higher than the resolution (an example of the "first resolution" in the disclosure) of the object 4 under inspection photographed in the image captured by the camera 2 in Step S102, and the defect candidate 7 is more clearly photographed. Then, in the search for the defect candidate 7 performed by analyzing the image of Step S102, the high computing capacity necessary for determining the defect 6 performed by using the image of Step S105 is not required. Therefore, in the case of the image inspecting apparatus 1 of the above embodiment, regarding the process of determining whether the defect 6 is present or absent in Step S106, which requires a computing capacity higher than that of the search for the defect candidate 7 performed in Step S103, since the process of determination for the part where the defect candidate 7 is not found is omitted, the time required for image inspection of the object 4 under inspection is shortened as compared to the case in which the determination on whether the defect 6 is present or absent is performed over the entire object 4 under inspection.

In the image inspecting apparatus 1 of the above embodiment, since the appearance of the object 4 under inspection is inspected by using the camera 2 provided at the tip of the robot arm 3, the camera 2 can be moved to the appropriate position with respect to the object 4 under inspection according to the form of the object 4 under inspection. Therefore, in the case of the image inspecting apparatus 1 of the above embodiment, for example, it is possible to cope with multi-type, small-scale production while shortening the time required for image inspection.

It should be noted that, in Step S103, the feature value of the defect candidate 7 or a value indicating the grade of the defect 6 may also be calculated.

Examples of the feature value of the defect candidate 7 include the position of the defect candidate 7. If the position of the defect candidate 7 is calculated in Step S103, in Step S104, when the robot arm 3 is moved so that the camera 2 approaches the defect candidate 7, the position of the defect candidate 7 can be used for determining the target position which is the destination of the camera 2. Regarding the position of the defect candidate 7, for example, if the defect candidate 7 is found from the difference with respect to the reference image in which a good object under inspection without a defect is photographed, the position of the defect candidate 7 can be specified based on the position where the difference is generated in the image. If the position of the defect candidate 7 is calculated in Step S103, in determining the motion of the robot arm 3 at the time of moving the camera 2 in Step S104, it is possible to promptly determine the most appropriate motion of each joint after moving the camera 2 to the position where the defect candidate 7 is clearly photographed, and send the amount of control to the motor of the robot arm 3 according to the determined motion.

Also, if the position of the defect candidate 7 is calculated as the feature value of the defect candidate 7, the feature value of the defect candidate 7 can also be used to determine, for example, the relative angle between the optical axis of the camera 2 and the object 4 under inspection, the relative positions between the lighting 2L and the object 4 under inspection, and the relative angle between the optical axis of the lighting 2L and the object 4 under inspection, in addition to the destination of the camera 2. In the case in which the defect candidate 7 is photographed obliquely by the camera 2 even if the camera 2 approaches the defect candidate 7, the part of the defect candidate 7 is still not photographed clearly in the image of the camera 2. In this regard, if the position of the defect candidate 7 is calculated in Step S103, in order to clearly photograph the defect candidate 7, the normal direction at the position of the defect candidate 7 can be matched with the optical axis of the camera 2, for example.

Figure 4:
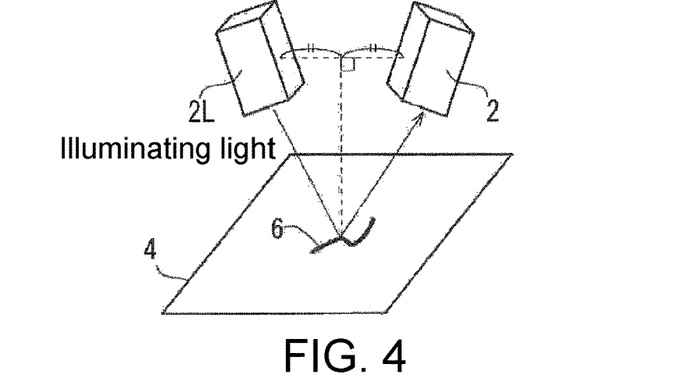
FIG. 4 is a view showing an example of a positional relationship among a camera, a lighting, and a defect.

Also, if the position of the defect candidate 7 is calculated in Step S103, in order to clearly photograph the defect candidate 7, for example, the positions of the camera 2 and the lighting 2L can be determined so that the defect candidate 7 is positioned on a virtual straight line that is orthogonal to another virtual straight line connecting the camera 2 and the lighting 2L and passes through a position bisecting the another virtual straight line. FIG. 4 is a view showing an example of the positional relationship among the camera 2, the lighting 2L, and defect 6. Depending on the material of the object 4 under inspection and the shape of the defect 6, there are cases in which the defect 6 is photographed clearly when the optical axis of the camera 2 is arranged obliquely with respect to the normal line of the part of the defect 6. Therefore, when determining the destination of the camera 2 in Step S104, as shown in FIG. 4 for example, in order for the camera 2 to clearly photograph the defect 6 illuminated by the lighting 2L, the camera 2 and the lighting 2L may be moved so that the defect candidate 7 is positioned on the virtual straight line that is orthogonal to the another virtual straight line connecting the camera 2 and the lighting 2L and passes through the position bisecting the another virtual straight line.

Further, examples of the value indicating the grade of the defect 6 include a difference value between a model image of the defect candidate 7 photographed in the image captured at Step S102 and the image of the object 4 under inspection. The difference value is proportional to, for example, the number of pixels of the region where the difference is generated in the image, etc. If the value indicating the grade of the defect 6 is calculated in Step S103, in the case in which the defect candidates 7 are found from a plurality of places in Step S103, the process since Step S104 can be executed preferentially from the defect candidate 7 having a great value indicating the grade of the defect 6. If the process since Step S104 is executed preferentially from the defect candidate 7 having a great value indicating the grade of defect 6, since the determination on whether the defect 6 is present or absent is made preferentially from the defect candidate 7 having a high possibility that the defect 6 is actually present, the image inspection of the object 4 under inspection is performed efficiently. In this case, for example, in the case in which the presence of at least one defect 6 is recognized in the object 4 under inspection, the determination on whether the defect 6 is present or absent in the parts of other defect candidates 7 can be omitted, and the inspection of the object 4 under inspection can be finished promptly.

Also, even though the part of the defect candidate 7 is clearly photographed by moving the position of the camera 2 to capture the image more closely in Step 105 than in Step S102 in the above embodiment, the part of the defect candidate 7 may also be clearly photographed by changing the setting state of the image capturing element provided in the camera 2, setting the state of the lens such as the position of the focus lens provided in the camera 2, or other means, for example.

Even though image capturing in Step S102 and Step S105 is performed by using one camera 2 in the above embodiment, separate cameras 2 may be used in the respective steps, for example. In this case, image capturing in Step S102 and image capturing in Step S105 can be performed simultaneously by using the separate cameras 2, so the inspection of the object 4 under inspection can be sped up.

Figure 5:
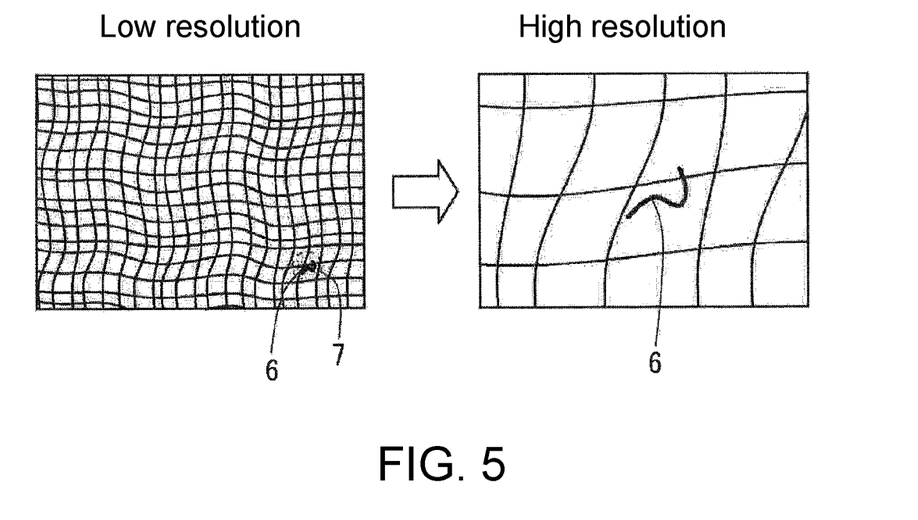
FIG. 5 is a view showing an example of defect.

FIG. 5 is a view showing an example of the defect 6. For example, the object 4 under inspection may be subjected to fine unevenness processing for decoration, such as embossing. Meanwhile, as described above, the defect 6 has a so-called scratch or dent mark. The scratch or dent mark can be considered as a fine recess on the surface of the defect 6. In other words, the unevenness of the embossing and the recess of the defect 6 essentially have similar physical properties. The difference, if any, is the size, the shape, the uniformity, the periodicity of the unevenness. Therefore, for example, if a threshold is set so that scratch or dent mark can be detected with low-level image processing (e.g., LOG), part of the embossing may be erroneously detected as a defect. To discriminate between the embossing and the scratch or dent mark, it is necessary to perform an analysis by using features such as shape. However, for this purpose, it is necessary to obtain images with a sufficient resolution, and a high computing capacity is required. Therefore, if such processing is performed over the entirety of the object 4 under inspection by using the image in which the object 4 under inspection is photographed, tremendous computing capacity and time are required. Further, if a threshold is set to prevent occurrence of such erroneous detection, the possibility that a defect is not detected is increased.

In this regard, in the image inspecting apparatus 1 of the above embodiment, Step S106 in which the analysis using features such as shape is performed is not performed over the entirety of the object 4 under inspection but on the part of the defect candidate 7. Therefore, for example, in the search for the defect candidate 7 performed using the image of Step S102, by setting the threshold so that the defect 6 is not overlooked, even in the case in which the part without defect 6 is determined to be the defect candidate 7, it does not require much computing capacity and time as compared with the case in which the analysis using features such as shape is performed over the entire object 4 under inspection. Therefore, compared to the case in which the determination on presence or absence of the defect 6 is performed over the entire object 4 under inspection, the time required for the image inspection of the object 4 under inspection is shortened.

<Computer-Readable Recording Medium> A program for causing a computer or other machines or apparatuses (hereinafter, the computer or the like) to realize any one of the above processes can be recorded on a recording medium readable by the computer or the like, and the computer or the like reads and executes the program of the recording medium, so that the function can be provided.

Here, the recording medium readable by the computer or the like refers to a recording medium that can accumulate information such as data, programs, etc. by electrical, magnetic, optical, mechanical, or chemical functioning, and can be read from a computer or the like. Among such recording media, those that can be detached from the computer or the like include, for example, a memory card such as a flexible disk, a magneto optical disk, a CD-ROM, a CD-R/W, a DVD, a Blu-ray (Blu-ray is a registered trademark) disk, DAT, an 8-mm tape, a flash memory, etc. In addition, recording media fixed to the computer or the like include a hard disk, an SSD, a read only memory (ROM), etc.

It should be noted that the above-described embodiments and modifications are examples of the disclosure, and the technical scope of the invention disclosed in the disclosure is not limited to the above embodiments and modified examples.

What is claimed is:

1. An image inspecting apparatus for inspecting an object under inspection by using an image, the image inspecting apparatus comprising:
    at least one image capturing part which captures an image of the object under inspection;
    a lighting part which irradiates the object under inspection with light;
    a control part of image capturing condition which comprises a moving part for changing a mutual relative positional relationship of at least two of the image capturing part, the object under inspection, and the lighting part;
    a searching part which analyzes an image captured by the image capturing part under a first image capturing condition and searches for a defect candidate from the object under inspection; and
    a determining part which analyzes the image captured by the image capturing part and determines whether a defect of the object under inspection is present or absent,
    wherein when the searching part finds the defect candidate from the object under inspection, the searching part calculates a feature value of the defect candidate comprising at least one of circularity, perimeter, and a Feret's diameter of the defect candidate, and the control part controls an image capturing condition based on the calculated feature value, such that a part where the defect candidate is found by the searching part is photographed under a second image capturing condition that is clearer than the first mage capturing condition, and
    wherein the determining part analyzes an image captured by the image capturing part under the second image capturing condition and determines whether the defect of the object under inspection is present or absent.

2. The image inspecting apparatus according to claim 1, wherein the searching part analyzes an image captured by the image capturing part at a first resolution and searches for the defect candidate from the object under inspection, and
    wherein when the searching part finds the defect candidate from the object under inspection, the control part changes a relative position of the image capturing part with respect to the object under inspection or a field of view of the image capturing part, such that the part where the defect candidate is found by the searching part is photographed at a second resolution that is a resolution higher than the first resolution.

3. The image inspecting apparatus according to claim 2, wherein the searching part analyzes the image of the object under inspection photographed at the first resolution by moving the image capturing part to a first position by the control part and searches for the defect candidate from the object under inspection, and
    wherein when the searching part finds the defect candidate from the object under inspection, the control part moves a position of the image capturing part to a second position closer to the object under inspection than the first position, such that the part where the defect candidate is found by the searching part is photographed at the second resolution.

4. The image inspecting apparatus according to claim 1, wherein when the searching part finds the defect candidate from the object under inspection, the control part changes at least one of a relative angle between an optical axis of the image capturing part and the object under inspection, relative positions between the lighting part and the object under inspection, and a relative angle between an optical axis of the lighting part and the object under inspection based on the feature value calculated by the searching part, such that the part where the defect candidate is found by the searching part is photographed under the second image capturing condition.

5. The image inspecting apparatus according to claim 1, wherein the searching part analyzes an image captured by a first image capturing part under the first image capturing condition and searches for the defect candidate from the object under inspection, and wherein when the searching part finds the defect candidate from the object under inspection, the control part controls the image capturing condition such that the part where the defect candidate is found by the searching part is photographed under the second image capturing condition in an image captured by a second image capturing part different from the first image capturing part.

6. The image inspecting apparatus according to claim 2, wherein the searching part analyzes an image captured by a first image capturing part under the first image capturing condition and searches for the defect candidate from the object under inspection, and wherein when the searching part finds the defect candidate from the object under inspection, the control part controls the image capturing condition such that the part where the defect candidate is found by the searching part is photographed under the second image capturing condition in an image captured by a second image capturing part different from the first image capturing part.

7. The image inspecting apparatus according to claim 4, wherein the searching part analyzes an image captured by a first image capturing part under the first image capturing condition and searches for the defect candidate from the object under inspection, and wherein when the searching part finds the defect candidate from the object under inspection, the control part controls the image capturing condition such that the part where the defect candidate is found by the searching part is photographed under the second image capturing condition in an image captured by a second image capturing part different from the first image capturing part.

8. The image inspecting apparatus according to claim 1, wherein when the searching part finds a plurality of defect candidates from the object under inspection, the control part controls the image capturing condition, such that a part of a candidate whose value indicating a grade of a defect is great, among the defect candidates found by the searching part, is preferentially photographed under the second image capturing condition.

9. The image inspecting apparatus according to claim 2, wherein when the searching part finds a plurality of defect candidates from the object under inspection, the control part controls the image capturing condition, such that a part of a candidate whose value indicating a grade of a defect is great, among the defect candidates found by the searching part, is preferentially photographed under the second image capturing condition.

10. The image inspecting apparatus according to claim 3, wherein when the searching part finds a plurality of defect candidates from the object under inspection, the control part controls the image capturing condition, such that a part of a candidate whose value indicating a grade of a defect is great, among the defect candidates found by the searching part, is preferentially photographed under the second image capturing condition.

11. The image inspecting apparatus according to claim 4, wherein when the searching part finds a plurality of defect candidates from the object under inspection, the control part controls the image capturing condition, such that a part of a candidate whose value indicating a grade of a defect is great, among the defect candidates found by the searching part, is preferentially photographed under the second image capturing condition.

12. The image inspecting apparatus according to claim 5, wherein when the searching part finds a plurality of defect candidates from the object under inspection, the control part controls the image capturing condition, such that a part of a candidate whose value indicating a grade of a defect is great, among the defect candidates found by the searching part, is preferentially photographed under the second image capturing condition.

13. The image inspecting apparatus according to claim 6, wherein when the searching part finds a plurality of defect candidates from the object under inspection, the control part controls the image capturing condition, such that a part of a candidate whose value indicating a grade of a defect is great, among the defect candidates found by the searching part, is preferentially photographed under the second image capturing condition.

14. The image inspecting apparatus according to claim 7, wherein when the searching part finds a plurality of defect candidates from the object under inspection, the control part controls the image capturing condition, such that a part of a candidate whose value indicating a grade of a defect is great, among the defect candidates found by the searching part, is preferentially photographed under the second image capturing condition.

15. The image inspecting apparatus according to claim 8, wherein in a case in which a defect is present in an image in which at least one of the defect candidates found by the searching part is photographed, the determining part omits analyses of images in which other defect candidates are photographed.

16. The image inspecting apparatus according to claim 9, wherein in a case in which a defect is present in an image in which at least one of the defect candidates found by the searching part is photographed, the determining part omits analyses of images in which other defect candidates are photographed.

17. The image inspecting apparatus according to claim 10, wherein in a case in which a defect is present in an image in which at least one of the defect candidates found by the searching part is photographed, the determining part omits analyses of images in which other defect candidates are photographed.

18. The image inspecting apparatus according to claim 11, wherein in a case in which a defect is present in an image in which at least one of the defect candidates found by the searching part is photographed, the determining part omits analyses of images in which other defect candidates are photographed.

19. An image inspecting method for inspecting an object under inspection by using an image, the image inspecting method comprising:

a searching process for analyzing an image captured under a first image capturing condition by an image capturing part that captures an image of the object under inspection, searching for a defect candidate from the object under inspection, and calculating a feature value of the defect candidate comprising at least one of circularity, perimeter, and a Feret's diameter of the defect candidate when finding the defect candidate from the object under inspection;

a control process based on the calculated feature value for controlling an image capturing condition by a control part of image capturing condition comprising a moving part for changing a mutual relative positional relationship of at least two of the image capturing part, the object under inspection, and a lighting part which irradiates the object under inspection with light, such that when the defect candidate is found from the object under inspection in the searching process, a part where the defect candidate is found in the searching process is photographed under a second image capturing condition clearer than the first image capturing condition; and a determining process for analyzing an image captured by the image capturing part under the second image capturing condition and determining whether a defect of the object under inspection is present or absent.

20. A non-transitory computer readable recording medium comprising an image inspecting program for inspecting an object under inspection by using an image, the image inspecting program causing a computer to execute following:

a searching process for analyzing an image captured under a first image capturing condition by an image capturing part that captures an image of the object under inspection, searching for a defect candidate from the object under inspection, and calculating a feature value of the defect candidate comprising at least one of circularity, perimeter, and a Feret's diameter of the defect candidate when finding the defect candidate from the object under inspection;

a control process based on the calculated feature value for controlling an image capturing condition by a control part of image capturing condition comprising a moving part for changing a mutual relative positional relationship of at least two of the image capturing part, the object under inspection, and a lighting part which irradiates the object under inspection with light, such that when the defect candidate is found from the object under inspection in the searching process, a part where the defect candidate is found in the searching process is photographed under a second image capturing condition clearer than the first image capturing condition; and a determining process for analyzing an image captured by the image capturing part under the second image capturing condition and determining whether a defect of the object under inspection is present or absent.

* * * * *